(12) United States Patent
Fu et al.

(10) Patent No.: US 12,183,324 B2
(45) Date of Patent: Dec. 31, 2024

(54) SPEECH RECOGNITION AND CODEC METHOD AND APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Xiaoyin Fu, Beijing (CN); Zhijie Chen, Beijing (CN); Mingxin Liang, Beijing (CN); Mingshun Yang, Beijing (CN); Lei Jia, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 351 days.

(21) Appl. No.: 17/738,651

(22) Filed: May 6, 2022

(65) Prior Publication Data

US 2023/0090590 A1    Mar. 23, 2023

(30) Foreign Application Priority Data

Sep. 13, 2021   (CN) .......................... 202111069754.9

(51) Int. Cl.
*G10L 15/02* (2006.01)
*G06F 16/683* (2019.01)
(Continued)

(52) U.S. Cl.
CPC ............ *G10L 15/02* (2013.01); *G06F 16/683* (2019.01); *G10L 15/187* (2013.01); *G10L 15/26* (2013.01)

(58) Field of Classification Search
CPC ....... G10L 15/02; G10L 15/187; G10L 15/26; G10L 15/16; G10L 15/22; G10L 19/0018; G06F 16/683
(Continued)

(56) References Cited

U.S. PATENT DOCUMENTS

2017/0162203 A1*  6/2017  Huang .................. G10L 15/197
2020/0219486 A1*  7/2020  Fu ........................... G10L 15/10
(Continued)

FOREIGN PATENT DOCUMENTS

CN   111429889 A    7/2020
CN   111627418 A    9/2020
(Continued)

OTHER PUBLICATIONS

Extended European Search Report of European application No. 22171064.3 dated Aug. 5, 2022, 9 pages.
(Continued)

*Primary Examiner* — Pierre Louis Desir
*Assistant Examiner* — Fouzia Hye Solaiman
(74) *Attorney, Agent, or Firm* — Brooks Kushman P.C.

(57) ABSTRACT

The present disclosure provides speech recognition and codec methods and apparatuses, an electronic device and a storage medium, and relates to the field of artificial intelligence such as intelligent speech, deep learning and natural language processing. The speech recognition method may include: acquiring an audio feature of to-be-recognized speech; encoding the audio feature to obtain an encoding feature; truncating the encoding feature to obtain continuous N feature fragments, N being a positive integer greater than one; and acquiring, for any one of the feature segments, corresponding historical feature abstraction information, encoding the feature segment in combination with the historical feature abstraction information, and decoding an
(Continued)

encoding result to obtain a recognition result corresponding to the feature segment, wherein the historical feature abstraction information is information obtained by feature abstraction of recognized historical feature fragments.

13 Claims, 6 Drawing Sheets

(51) Int. Cl.
  *G10L 15/187* (2013.01)
  *G10L 15/26* (2006.01)
(58) Field of Classification Search
  USPC .......................................................... 704/231
  See application file for complete search history.

(56) References Cited

U.S. PATENT DOCUMENTS

| | | | | |
|---|---|---|---|---|
| 2020/0402507 | A1* | 12/2020 | Neelakantan | G06N 3/047 |
| 2021/0020175 | A1* | 1/2021 | Shao | G10L 15/22 |
| 2021/0056975 | A1* | 2/2021 | Peng | G10L 17/04 |
| 2021/0201887 | A1* | 7/2021 | Chen | G06N 3/045 |

FOREIGN PATENT DOCUMENTS

| | | |
|---|---|---|
| CN | 112331185 A | 2/2021 |
| CN | 112382278 A | 2/2021 |
| CN | 112530437 A | 3/2021 |
| CN | 112735428 A | 4/2021 |
| CN | 112908305 A | 6/2021 |
| CN | 113362812 A | 9/2021 |
| EP | 3680894 A1 | 7/2020 |
| JP | 2020112787 A | 7/2020 |

OTHER PUBLICATIONS

Xu et al., Research on Human-Computer Intelligent Interaction Method Based on Speech Recognition and Natural Language Processing Dialogue Stream, Abstract, Jul. 31, 2021, 2 pages.

Miao et al., Online Hybrid CTC/attention End-to-End Automatic Speech Recognition Architecture, Transactions on Audio, Speech, and Language Processing, Apr. 20, 2020, 14 pages.

Bell et al., "Adaptation Algorithms for Neural Network-Based Speech Recognition: An Overview", arxiv.org, Cornell University Library, 201 Olin Library Cornell University Ithaca, NY 14853, Feb. 28, 2021 (Feb. 28, 2021), XP081886005.

Kim et al., "A Review of On-Device Fully Neural End-to-End Automatic Speech Recognition Algorithms", 2020 54th Asilomar Conference on Signals, Systems, and Computers, IEEE, Nov. 1, 2020 (Nov. 1, 2020), pp. 277-283, XP033922000.

Karmakar et al., "Thank you for Attention: A survey on Attention-based Artificial Neural Networks for Automatic Speech Recognition", arxiv.org, Cornell University Library, 201 Olin Library Cornell University Ithaca, NY 14853, Feb. 14, 2021 (Feb. 14, 2021), XP081884855.

Burchi et al., "Efficient conformer: Progressive downsampling and grouped attention for automatic speech recognition", arxiv.org, Cornell University Library, 201 Olin Library Cornell University Ithaca, NY 14853, Aug. 31, 2021 (Aug. 31, 2021), XP091048992.

Gulati et al.,"Conformer: Convolution-augmented Transformer for Speech Recognition", arxiv.org, Cornell University Library, 201 Olin Library Cornell University Ithaca, NY 14853, May 16, 2020 (May 16, 2020), XP081674848.

Decision to Grant a Patent of Japanese application No. JP2022084092 dated May 23, 2023, 2 pages.

* cited by examiner

SPEECH RECOGNITION AND CODEC METHOD AND APPARATUS, ELECTRONIC DEVICE AND STORAGE MEDIUM

CROSS-REFERENCE TO RELATED APPLICATIONS

The present application claims the priority of Chinese Patent Application No. 202111069754.9, filed on Sep. 13, 2021, with the title of "SPEECH RECOGNITION AND CODEC METHOD AND APPARATUS, ELECTRONIC DEVICE AND STORAGE MEDIUM." The disclosure of the above application is incorporated herein by reference in its entirety.

TECHNICAL FIELD

The present disclosure relates to the field of artificial intelligence technologies, and in particular, to speech recognition and codec methods and apparatuses, an electronic device and a storage medium in fields such as intelligent speech, deep learning and natural language processing.

BACKGROUND

Automatic speech recognition refers to a process of automatically converting inputted speech into corresponding text by a computer. With the in-depth research of a deep learning technology in the field of speech recognition, especially the proposal of an end-to-end speech recognition technology, the performance of a speech recognition system has been greatly improved. Moreover, with the continuous popularization of various intelligent devices, speech recognition products with large vocabulary have been widely used in fields such as intelligent customer services, vehicle-mounted navigation and intelligent speakers.

In speech recognition with large vocabulary, lengths of audio data are mostly more than 1000 frames or even more than 10,000 frames. During the speech recognition, the accuracy of recognition results is required to be guaranteed, and relatively high recognition efficiency (i.e. response speed) is also required. For example, real-time presentation of the recognition results is required. No preferred implementations have been proposed in the prior art.

SUMMARY

The present disclosure provides speech recognition and codec methods and apparatuses, an electronic device and a storage medium.

A speech recognition method includes acquiring an audio feature of to-be-recognized speech; encoding the audio feature to obtain an encoding feature; truncating the encoding feature to obtain continuous N feature fragments, N being a positive integer greater than one; and acquiring, for any one of the feature segments, corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments.

A codec method includes acquiring a feature corresponding to a to-be-processed object, the feature including at least a feature obtained according to historical output information of a decoder; encoding the feature by using an encoder, to obtain an encoding result; and decoding the encoding result by using the decoder, to obtain a processing result corresponding to the to-be-processed object.

An electronic device includes at least one processor; and a memory communicatively connected with the at least one processor; wherein the memory stores instructions executable by the at least one processor, and the instructions are executed by the at least one processor to enable the at least one processor to perform a speech recognition method, wherein the speech recognition method includes acquiring an audio feature of to-be-recognized speech; encoding the audio feature to obtain an encoding feature; truncating the encoding feature to obtain continuous N feature fragments, N being a positive integer greater than one; and acquiring, for any one of the feature segments, corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments.

A non-transitory computer readable storage medium with computer instructions stored thereon, wherein the computer instructions are used for causing a speech recognition method, wherein the speech recognition method includes acquiring an audio feature of to-be-recognized speech; encoding the audio feature to obtain an encoding feature; truncating the encoding feature to obtain continuous N feature fragments, N being a positive integer greater than one; and acquiring, for any one of the feature segments, corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF THE DRAWINGS

The accompanying drawings are intended to provide a better understanding of the solutions and do not constitute a limitation on the present disclosure. In the drawings.

DETAILED DESCRIPTION

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

In addition, it is to be understood that the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

Figure 1:
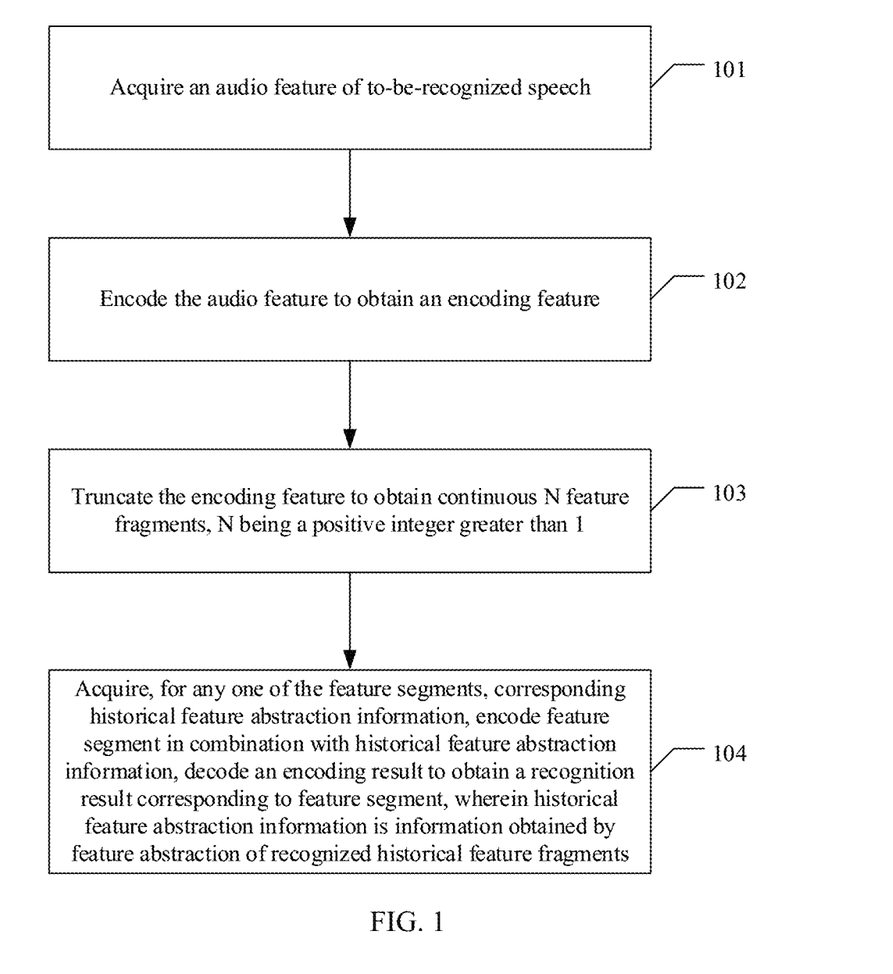
FIG. 1 is a flowchart of an embodiment of a speech recognition method according to the present disclosure.

FIG. 1 is a flowchart of an embodiment of a speech recognition method according to the present disclosure. As shown in FIG. 1, the following specific implementations are included.

In step 101, an audio feature of to-be-recognized speech is acquired.

In step 102, the audio feature is encoded to obtain an encoding feature.

In step 103, the encoding feature is truncated to obtain continuous N feature fragments, N being a positive integer greater than one.

In step 104, for any one of the feature segments, corresponding historical feature abstraction information is acquired, the feature segment is encoded in combination with the historical feature abstraction information, and an encoding result is decoded to obtain a recognition result corresponding to the feature segment, wherein the historical feature abstraction information is information obtained by feature abstraction of recognized historical feature fragments.

As can be seen, in the solution according to the above method embodiment, feature fragments corresponding to to-be-recognized speech may be obtained, and a currently processed feature fragment may be encoded in combination with historical feature fragments, so as to improve the accuracy of a recognition result. Moreover, feature abstraction may be performed on the historical feature fragments to obtain historical feature abstraction information, and encoding is performed according to the historical feature abstraction information, so as to improve the efficiency of recognition.

The execution subject in the embodiment shown in FIG. 1 is not limited, which may be, for example, a user equipment or a server. For example, the user equipment may collect speech of a user in real time and process the collected speech in the manner shown in FIG. 1, or the user equipment may collect speech of a user in real time and send the collected speech to the server, and the server processes it in the manner shown in FIG. 1.

An audio feature of to-be-recognized speech may be acquired first. How to acquire the audio feature of the to-be-recognized speech is not limited. For example, the audio feature of the to-be-recognized speech may be acquired in an existing audio feature extraction manner.

Then, the acquired audio feature is encoded to obtain an encoding result, that is, an encoding feature, which may also be referred to as a bottleneck feature. In one embodiment of the present disclosure, prior to the encoding, convolution downsampling may be performed on the acquired audio feature first, and then the downsampled audio feature may be encoded to obtain an encoding feature.

For example, 2 convolution layers may be used, and convolution downsampling with a stride of 2 may be performed in each convolution layer.

With the above processing, a frame rate of the acquired audio feature may be reduced to ¼ of an original frame rate for example, so as to reduce the workload of subsequent processing, reduce resource consumption and improve the processing efficiency without losing key information of the audio feature.

In one embodiment of the present disclosure, the acquired audio feature or the downsampled audio feature may be encoded by using a first encoder. The first encoder may be a casual convolution augmented conformer encoder. The conformer refers to a transformer model. The first encoder may include an M-layer causal conformer model. M is a positive integer. The causal conformer model integrates a time-masked attention model and a causal convolution model. Specifically, the time-masked attention model may be a time-masked Multi-Head Self-Attention (MHSA) model. The specific value of M may be determined according to an actual requirement, which is generally greater than 1.

Since the causal conformer model integrates the attention model and the convolution model, a long distance relation and a local relation in the audio feature can be effectively modeled at the same time, thereby greatly improving description capability of the model. In addition, time mask and causal convolution are introduced into the attention model and the convolution model respectively, so as to ensure that the audio feature only depends on historical audio features during the encoding, thereby meeting requirements of streaming speech recognition.

In practical applications, in addition to the time-masked attention model and the causal convolution model, each causal conformer model may also include a feed forward neural network model at a head and a tail respectively. Specific content included may be determined according to an actual requirement, and the content herein is only an example.

In one embodiment of the present disclosure, in combination with the encoding of the audio feature and a Connectionist Temporal Classification (CTC) loss, peak information (CTC peak) corresponding to the encoding feature may also be determined. Correspondingly, the encoding feature may be truncated according to the peak information. Each peak may indicate a syllable or a set of phonemes.

In one embodiment of the present disclosure, an encoding feature located between each two adjacent peaks may be taken as a feature segment.

Figure 2:
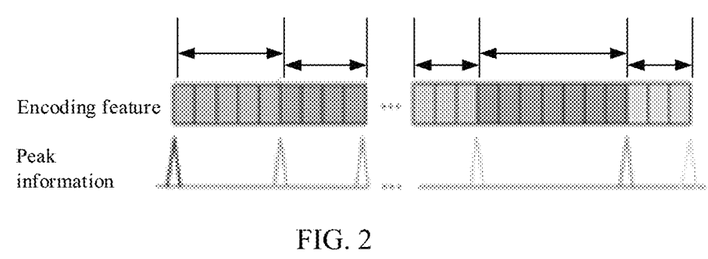
FIG. 2 is a schematic diagram of a manner of dividing a feature fragment according to the present disclosure.

FIG. 2 is a schematic diagram of a manner of dividing a feature fragment according to the present disclosure. As shown in FIG. 2, the acquired encoding feature may be truncated according to the peak information, so as to obtain a plurality of continuous feature fragments with unequal lengths.

As can be seen, a required feature fragment may be easily and efficiently acquired by means of the peak information, so as to lay a good foundation for subsequent processing.

In practical applications, acquired feature fragments may be processed successively. The following processing may be performed for each feature segment: acquiring corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments.

In one embodiment of the present disclosure, for each feature fragment, the feature segment may be encoded in combination with the historical feature abstraction information by using a second encoder, and the encoding result may be decoded by using a first decoder. The historical feature abstraction information may be generated according to output information of the decoder.

In various models currently used, such as a transformer model, a relationship between an encoder and a decoder is only reflected in the fact that output of the encoder is input to the decoder, an encoding process of the encoder is not directly affected by the decoder, and the decoder can only indirectly affect the encoding process of the encoder by error transfer during end-to-end joint modeling. In the solution of the present disclosure, input to the encoder may be generated by using output of the decoder. Such interaction between the encoder and the decoder enables both to form a unified whole more effectively, significantly improves modeling capability of an end-to-end model, and provides a new solution for optimization of the end-to-end model, which is also a structural innovation for the end-to-end model.

The second encoder and the first decoder jointly constitute a conformer-structure based Streaming Multi-Layer Truncated Attention (SMLTA) model. The second encoder may be a streaming truncated conformer encoder. The first decoder may be a transformer decoder.

In one embodiment of the present disclosure, the second encoder may include a P-layer conformer model, P is a positive integer, a number of the first decoder may be Q, Q is a positive integer, and the Q first decoders may be successively connected. Specific values of P and Q may be determined according to an actual requirement. To improve the codec performance, the values of P and Q are typically greater than one.

That is, for each feature fragment, the feature fragment may be encoded layer by layer by using a P-layer stacked conformer model, and the encoded feature may be decoded by using Q stacked first decoders. For example, screening may be performed by attention to obtain corresponding probability distribution, and then a required recognition result may be acquired.

The manner of truncating an audio feature into feature fragments in the present disclosure enables the decoder to perform decoding synchronously during speech input, so as to meet requirements of streaming speech recognition on real-time performance of the decoding.

In one embodiment of the present disclosure, the following processing may be performed for any conformer model: performing feature abstraction on a feature fragment currently processed in the conformer model by using hidden layer features (or referred to as implicit features) acquired from any first decoder, to obtain a feature vector with a predetermined length, and taking the feature vector as a historical feature vector of the currently processed feature fragment corresponding to the conformer model. The obtained historical feature vector may be used for processing next feature fragment.

Correspondingly, when the corresponding historical feature abstraction information is acquired, the following processing may be performed for any feature fragment: for any conformer model, splicing historical feature vectors of historical feature fragments corresponding to the conformer model respectively, and taking a splicing result as required historical feature abstraction information.

Figure 3:
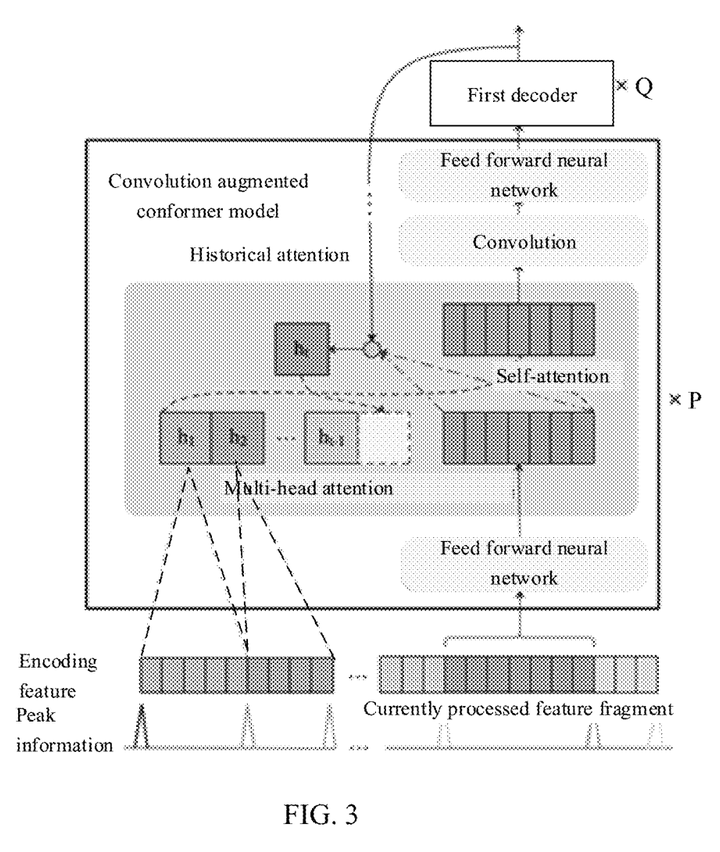
FIG. 3 is a schematic diagram of operating manners of a second decoder and a first decoder according to the present disclosure.

FIG. 3 is a schematic diagram of operating manners of a second decoder and a first decoder according to the present disclosure. As shown in FIG. 3, a currently processed feature fragment may be encoded layer by layer by using a P-layer stacked conformer model. Assuming that the currently processed feature fragment is a feature fragment t, in the conformer model in each layer, historical feature vectors of historical feature fragments corresponding to the conformer model may be spliced respectively, that is, $h_1, h_2, \ldots$, and $h_{t-1}$ shown in the figure are spliced, and a splicing result is taken as historical feature abstraction information corresponding to the feature fragment t. Then, encoding may be performed in combination with the acquired historical feature abstraction information and the feature fragment t. The processing manner in the conformer model in each layer is the same. In addition, the encoded feature corresponding to the feature fragment t may be decoded by using Q (layers) stacked first decoders, and hidden layer features may be acquired from any first decoder. Preferably, since more speech and acoustic information are included, the hidden layer features may be acquired from the final first decoder. Further, feature abstraction may be performed on the feature fragment t in the conformer model in each layer by attention by using the acquired hidden layer features, to obtain a feature vector with a fixed length, for example, $h_t$ shown in the figure. In this way, when next feature fragment, for example, the feature fragment t+1, is processed, $h_1, h_2, h_{t-i}$, and $h_t$ may be spliced, and a splicing result is taken as historical feature abstraction information corresponding to the feature fragment t+1. The specific length of the feature vector may be determined according to an actual requirement.

Figure 4:
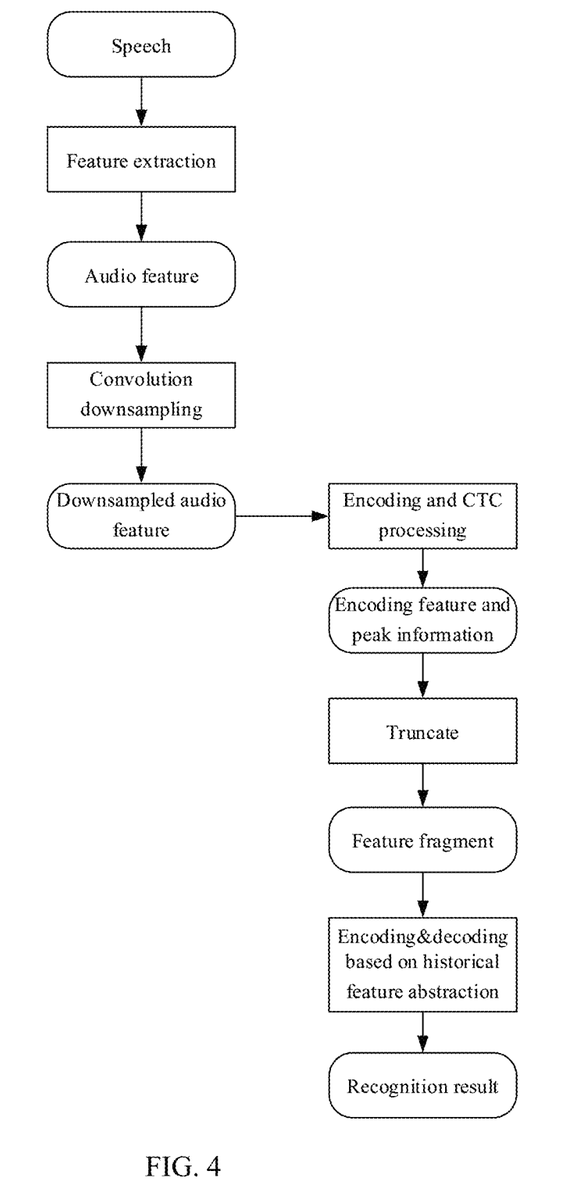
FIG. 4 is a schematic diagram of an overall implementation process of the speech recognition method according to the present disclosure.

Based on the above introduction, FIG. 4 is a schematic diagram of an overall implementation process of the speech recognition method according to the present disclosure. Specific implementation may be obtained with reference to the forgoing description, and is not described in detail.

In brief, by use of the solution of the present disclosure, a currently processed feature fragment may be encoded in combination with historical feature fragments, so as to improve the accuracy of a recognition result. Moreover, feature abstraction may be performed on the historical feature fragments to obtain historical feature abstraction information, and encoding is performed according to the historical feature abstraction information, so as to improve the efficiency of recognition. Moreover, a feature fragment obtained by division is abstracted into a feature vector with a fixed length, so that speech data can be effectively compressed, thereby reducing occupation of storage and computing resources, which may be applied to scenarios of end-to-end online speech recognition for massive training data and super-large parameter models.

In addition, the feature fragment in the solution of the present disclosure has an actual physical meaning. Each feature fragment corresponds to a piece of character information. A feature vector obtained by feature abstraction on the feature fragment of the encoder by using the hidden layer features outputted by the decoder is a summary of the character information included in each feature fragment. Historical feature abstraction information formed by such feature vectors by splicing actually forms a language model at the level of acoustic features. In addition, the feature abstraction on each layer of the encoder by using output information of the decoder enables more language relations in the acoustic features to be explored and significantly improves historical abstraction capability of the model. Moreover, the feature abstraction performed by using the hidden layer features of the decoder instead of a final output result can further solve the problem of "path inflation" in speech recognition and decoding.

Besides, in the solution of the present disclosure, when historical features are abstracted, feature abstraction may be performed on each layer in the encoder by using the hidden layer features outputted by the decoder, so that the decoder can directly affect the encoding process of the encoder. Such interaction between the encoder and the decoder enables both to form a unified whole more effectively, significantly improves modeling capability of an end-to-end model, and provides a new solution for optimization of the end-to-end model, which is also a structural innovation for the end-to-end model.

Figure 5:
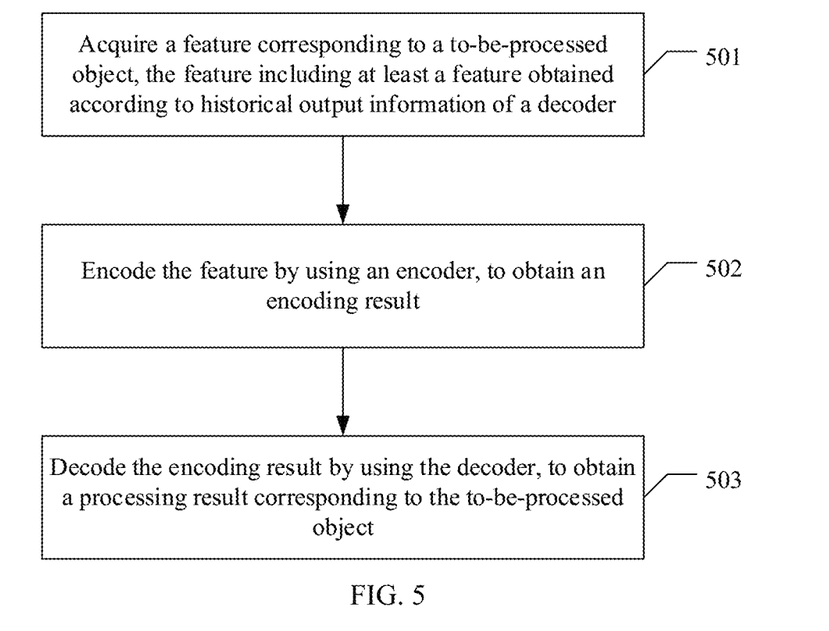
FIG. 5 is a flowchart of an embodiment of a codec method according to the present disclosure.

Correspondingly, a codec method is proposed in the present disclosure. FIG. 5 is a flowchart of an embodiment of a codec method according to the present disclosure. As shown in FIG. 5, the following specific implementations are included.

In step 501, a feature corresponding to a to-be-processed object is acquired, the feature including at least a feature obtained according to historical output information of a decoder.

In step 502, the feature is encoded by using an encoder, to obtain an encoding result.

In step 503, the encoding result is decoded by using the decoder, to obtain a processing result corresponding to the to-be-processed object.

In the solution of the above method embodiment, the encoder and the decoder interact, so that both can form a unified whole more effectively, and an input feature of the encoder is generated by using output information of the decoder, which significantly provides modeling capability of an end-to-end model, which is also a structural innovation for the end-to-end model.

In one embodiment of the present disclosure, the output information may include: hidden layer features outputted by the decoder. The hidden layer features of the decoder instead of a final output result are taken as the output information, so that the problem of "path inflation" in the decoding can be further solved.

In one embodiment of the present disclosure, the acquiring a feature corresponding to a to-be-processed object may include: acquiring historical feature abstraction information corresponding to the to-be-processed object, the historical feature abstraction information being information obtained by feature abstraction of historical processing objects.

In one embodiment of the present disclosure, feature abstraction may also be performed on the to-be-processed object by using the hidden layer features acquired from the decoder, to obtain a feature vector with a predetermined length, and the feature vector is taken as a historical feature vector corresponding to the to-be-processed object. Correspondingly, the manner of acquiring historical feature abstraction information corresponding to the to-be-processed object may include: splicing historical feature vectors corresponding to the historical processing objects respectively, and taking a splicing result as required historical feature abstraction information.

The method in FIG. 5 may be applied to the foregoing speech recognition scenario. Correspondingly, in one embodiment of the present disclosure, the to-be-processed object may include: any one of continuous N feature fragments obtained after an encoding feature corresponding to to-be-recognized speech is truncated, N is a positive integer greater than one, and the encoding feature is a feature obtained after an audio feature of the to-be-recognized speech is encoded. The processing result may include: a recognition result corresponding to the feature fragment. The acquiring a feature corresponding to a to-be-processed object may include: acquiring historical feature abstraction information corresponding to the to-be-processed object, the historical feature abstraction information being information obtained by feature abstraction of historical processing objects. That is, any feature fragment may be encoded in combination with the corresponding historical feature abstraction information by using an encoder, to obtain an encoding result, and the obtained encoding result may be decoded by using a decoder, to obtain a recognition result corresponding to the feature fragment.

The method shown in FIG. 5 may be applied to a variety of codec scenarios, and is not limited to the speech recognition scenario described above. The above is only an example.

For example, it may also be applied to long text translation and video detection scenarios in machine translation. In the long text translation scenario, historically translated sentences may be abstracted as an input feature of a currently translated sentence. In the video detection scenario, historically outputted feature information may be used in a current image detection process.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. Further, those skilled in the art should also appreciate that all the embodiments described in the specification are preferred embodiments, and the related actions and modules are not necessarily mandatory to the present disclosure. In addition, a part that is not described in detail in one embodiment may be obtained with reference to related descriptions in other embodiments.

The above is the introduction to the method embodiment. The following is a further illustration of the solution according to the present disclosure through an apparatus embodiment.

Figure 6:
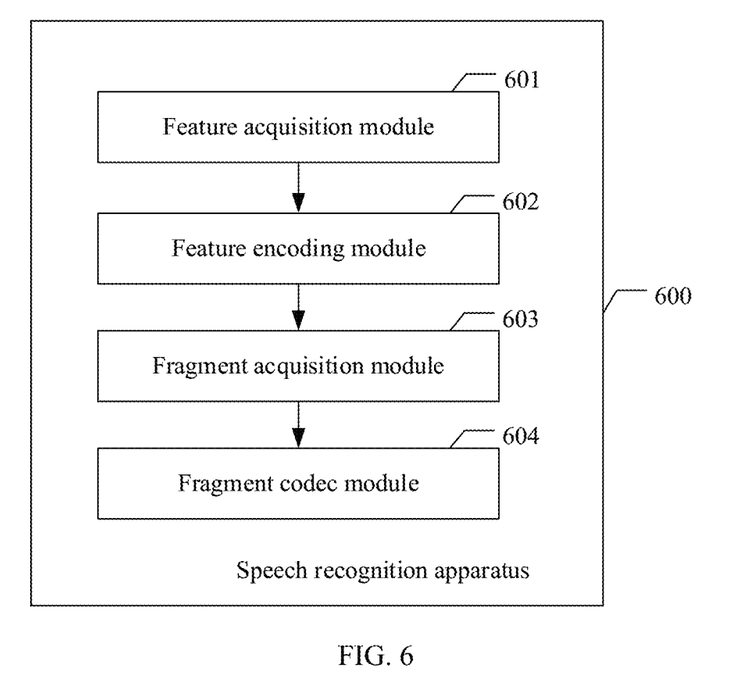
FIG. 6 is a schematic diagram of a composition structure of an embodiment of a speech recognition apparatus 600 according to the present disclosure.

FIG. 6 is a schematic diagram of a composition structure of an embodiment of a speech recognition apparatus 600 according to the present disclosure. As shown in FIG. 6, the apparatus includes: a feature acquisition module 601, a feature encoding module 602, a fragment acquisition module 603 and a fragment codec module 604.

The feature acquisition module 601 is configured to acquire an audio feature of to-be-recognized speech.

The feature encoding module 602 is configured to encode the audio feature to obtain an encoding feature.

The fragment acquisition module 603 is configured to truncate the encoding feature to obtain continuous N feature fragments, N being a positive integer greater than one.

The fragment codec module 604 is configured to acquire, for any one of the feature segments, corresponding historical feature abstraction information, encode the feature segment in combination with the historical feature abstraction information, and decode an encoding result to obtain a recognition result corresponding to the feature segment, wherein the historical feature abstraction information is information obtained by feature abstraction of recognized historical feature fragments.

In the solution according to the above apparatus embodiment, feature fragments corresponding to to-be-recognized speech may be obtained, and a currently processed feature fragment may be encoded in combination with historical feature fragments, so as to improve the accuracy of a recognition result. Moreover, feature abstraction may be performed on the historical feature fragments to obtain historical feature abstraction information, and encoding is performed according to the historical feature abstraction information, so as to improve the efficiency of recognition.

The feature acquisition module 601 may acquire an audio feature for to-be-recognized speech. Then, the feature encoding module 602 may encode the acquired audio feature, to obtain an encoding feature.

In one embodiment of the present disclosure, prior to the encoding, the feature acquisition module 601 may also perform convolution downsampling on the acquired audio feature first, and then the feature encoding module 602 may encode the downsampled audio feature to obtain an encoding feature. For example, 2 convolution layers may be used, and convolution downsampling with a stride of 2 may be performed in each convolution layer.

In one embodiment of the present disclosure, the feature encoding module 602 may encode the acquired audio feature or the downsampled audio feature by using a first encoder. The first encoder may be a casual conformer encoder. The first encoder may include an M-layer causal conformer model. M is a positive integer. The causal conformer model integrates a time-masked attention model and a causal convolution model. The specific value of M may be determined according to an actual requirement, which is generally greater than one.

In one embodiment of the present disclosure, the feature encoding module 602 may also determine peak information corresponding to the encoding feature in combination with the encoding of the audio feature and a CTC loss. Correspondingly, the fragment acquisition module 603 may truncate the encoding feature according to the peak information.

In one embodiment of the present disclosure, the fragment acquisition module 603 may take an encoding feature located between each two adjacent peaks as a feature segment.

In practical applications, the fragment codec module 604 may process acquired feature fragments successively. The following processing may be performed for each feature segment: acquiring corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments.

In one embodiment of the present disclosure, for each feature fragment, the fragment codec module 604 may encode the feature segment in combination with the historical feature abstraction information by using a second encoder, and decode the encoding result by using a first decoder. The historical feature abstraction information may be generated according to output information of the decoder.

In one embodiment of the present disclosure, the second encoder may include a P-layer conformer model, P is a positive integer, a number of the first decoder may be Q, Q is a positive integer, and the Q first decoders may be successively connected. Specific values of P and Q may be determined according to an actual requirement. To improve the codec performance, the values of P and Q are typically greater than one.

In one embodiment of the present disclosure, the fragment codec module 604 may perform the following processing for any conformer model: performing feature abstraction on a feature fragment currently processed in the conformer model by using hidden layer features acquired from any first decoder, to obtain a feature vector with a predetermined length, and taking the feature vector as a historical feature vector of the currently processed feature fragment corresponding to the conformer model. The obtained historical feature vector may be used for processing next feature fragment.

Correspondingly, when the corresponding historical feature abstraction information is acquired, the fragment codec module 604 may perform the following processing for any feature fragment: for any conformer model, splicing historical feature vectors of historical feature fragments corresponding to the conformer model respectively, and taking a splicing result as required historical feature abstraction information.

Figure 7:
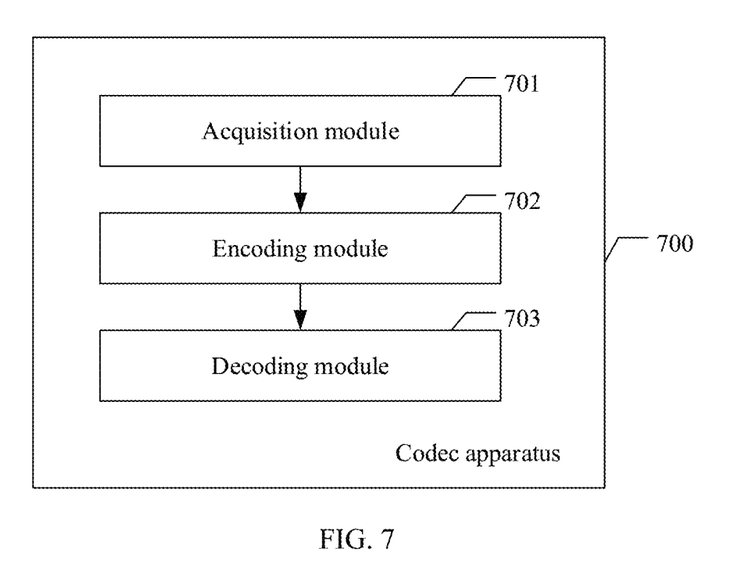
FIG. 7 is a schematic diagram of a composition structure of an embodiment of a codec apparatus 700 according to the present disclosure.

FIG. 7 is a schematic diagram of a composition structure of an embodiment of a codec 700 according to the present disclosure. As shown in FIG. 7, the apparatus includes: an acquisition module 701, an encoding module 702 and a decoding module 703.

The acquisition module 701 is configured to acquire a feature corresponding to a to-be-processed object, the feature including at least a feature obtained according to historical output information of a decoder.

The encoding module 702 is configured to encode the feature by using an encoder, to obtain an encoding result.

The decoding module 703 is configured to decode the encoding result by using the decoder, to obtain a processing result corresponding to the to-be-processed object.

In the solution of the above apparatus embodiment, the encoder and the decoder interact, so that both can form a unified whole more effectively, and an input feature of the encoder is generated by using output information of the decoder, which significantly provides modeling capability of an end-to-end model, which is also a structural innovation for the end-to-end model.

In one embodiment of the present disclosure, the output information may include: hidden layer features outputted by the decoder. The hidden layer features of the decoder instead of a final output result are taken as the output information, so that the problem of "path inflation" in the decoding can be further solved.

In one embodiment of the present disclosure, when acquiring a feature corresponding to a to-be-processed object, the acquisition module 701 may acquire historical feature abstraction information corresponding to the to-be-processed object, the historical feature abstraction information being information obtained by feature abstraction of historical processing objects.

In one embodiment of the present disclosure, the acquisition module 701 may also perform feature abstraction on the to-be-processed object by using the hidden layer features acquired from the decoder, to obtain a feature vector with a predetermined length, and the feature vector is taken as a historical feature vector corresponding to the to-be-processed object. Correspondingly, the manner of acquiring historical feature abstraction information corresponding to the to-be-processed object may include: splicing historical feature vectors corresponding to the historical processing objects respectively, and taking a splicing result as required historical feature abstraction information.

The apparatus in FIG. 7 may be applied to the foregoing speech recognition scenario. Correspondingly, in one embodiment of the present disclosure, the to-be-processed object may include: any one of continuous N feature fragments obtained after an encoding feature corresponding to to-be-recognized speech is truncated, N is a positive integer greater than one, and the encoding feature is a feature obtained after an audio feature of the to-be-recognized speech is encoded. The processing result may include: a recognition result corresponding to the feature fragment. The manner of acquiring a feature corresponding to a to-be-processed object by the acquisition module 701 may include: acquiring historical feature abstraction information corresponding to the to-be-processed object, the historical feature abstraction information being information obtained by feature abstraction of historical processing objects. That is, the encoding module 702 may encode any feature fragment in combination with the corresponding historical feature abstraction information by using an encoder, to obtain an encoding result, and the decoding module 703 may decode the obtained encoding result by using a decoder, to obtain a recognition result corresponding to the feature fragment.

The apparatus shown in FIG. 7 may be applied to a variety of codec scenarios, and is not limited to the speech recognition scenario described above. The above is only an example.

For example, it may also be applied to long text translation and video detection scenarios in machine translation. In the long text translation scenario, historically translated sentences may be abstracted as an input feature of a currently translated sentence. In the video detection scenario, historically outputted feature information may be used in a current image detection process.

Specific working processes of the apparatus embodiments shown in FIG. 6 and FIG. 7 may be obtained with reference to the related descriptions in the foregoing method embodiments.

The solution of the present disclosure may be applied to the field of artificial intelligence, and in particular, to fields such as intelligent speech, deep learning and natural language processing. Artificial intelligence is a discipline that studies how to make computers simulate certain thinking processes and intelligent behaviors (such as learning, reasoning, thinking and planning) of human beings, which includes hardware technologies and software technologies. The artificial intelligence hardware technologies generally include sensors, dedicated artificial intelligence chips, cloud computing, distributed storage, big data processing and other technologies. The artificial intelligence software technologies mainly include a computer vision technology, a speech recognition technology, a natural language processing technology, machine learning/deep learning, a big data processing technology, a knowledge graph technology and other major directions.

The speech in the embodiment of the present disclosure is not specific to a particular user, and cannot reflect personal information of the particular user. In addition, the execution subject of the speech recognition method may acquire the speech in various open, legal and compliant ways, such as from a user with the user's authorization. In short, collection, storage, use, processing, transmission, provision and disclosure of users' personal information involved in the technical solutions of the present disclosure comply with relevant laws and regulations, and do not violate public order and moral.

According to embodiments of the present disclosure, the present disclosure further provides an electronic device, a readable storage medium and a computer program product.

Figure 8:
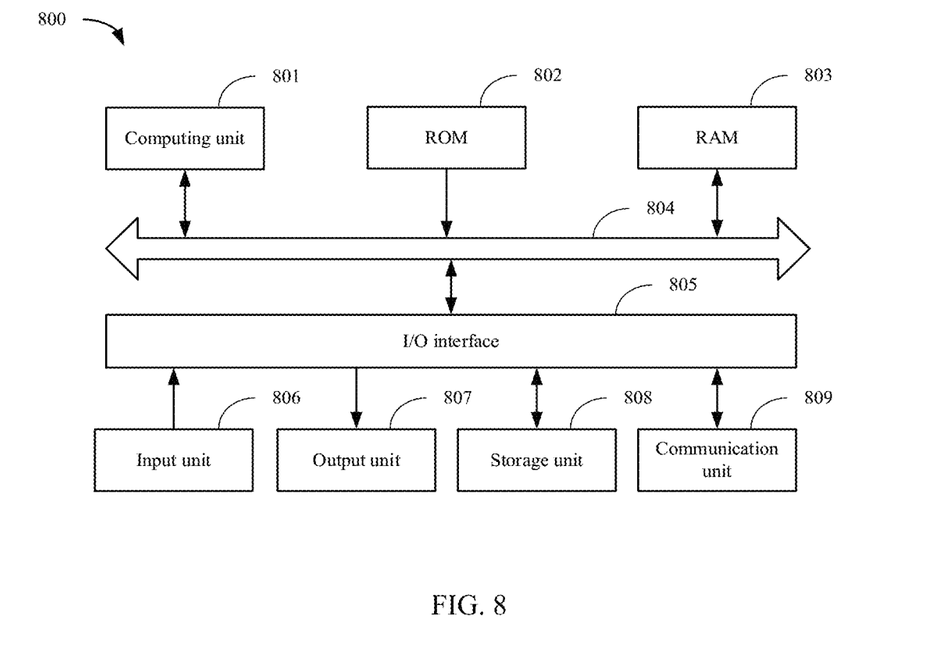
FIG. 8 is a schematic block diagram of an electronic device 800 configured to implement embodiments of the present disclosure.

FIG. 8 is a schematic block diagram of an electronic device 800 configured to implement embodiments of the present disclosure. The electronic device is intended to represent various forms of digital computers, such as laptops, desktops, workbenches, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 8, the device 800 includes a computing unit 801, which may perform various suitable actions and processing according to a computer program stored in a read-only memory (ROM) 802 or a computer program loaded from a storage unit 808 into a random access memory (RAM) 803. The RAM 803 may also store various programs and data required to operate the device 800. The computing unit 801, the ROM 802 and the RAM 803 are connected to one another by a bus 804. An input/output (I/O) interface 805 may also be connected to the bus 804.

A plurality of components in the device 800 are connected to the I/O interface 805, including an input unit 806, such as a keyboard and a mouse; an output unit 807, such as various displays and speakers; a storage unit 808, such as disks and discs; and a communication unit 809, such as a network card, a modem and a wireless communication transceiver. The communication unit 809 allows the device 800 to exchange information/data with other devices over computer networks such as the Internet and/or various telecommunications networks.

The computing unit 801 may be a variety of general-purpose and/or special-purpose processing components with processing and computing capabilities. Some examples of the computing unit 801 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 801 performs the methods and processing described above, such as the method according to the present disclosure. For example, in some embodiments, the method according to the present disclosure may be implemented as a computer software program that is tangibly embodied in a machine-readable medium, such as the storage unit 808. In some embodiments, part or all of a computer program may be loaded and/or installed on the device 800 via the ROM 802 and/or the communication unit 809. One or more steps of the method according to the present disclosure may be performed when the computer program is loaded into the RAM 803 and executed by the computing unit 801. Alternatively, in other embodiments, the computing unit 801 may be configured to perform the method according to the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the method in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation schema of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A computer-implemented speech recognition method, comprising:
  acquiring an audio feature of to-be-recognized speech collected by a user equipment in real time;
  encoding the audio feature to obtain an encoding feature;
  truncating the encoding feature to obtain continuous N feature fragments with unequal lengths, N being a positive integer greater than one;
  acquiring, for any one of the feature segments, corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments, wherein the encoding the feature segment in combination with the historical feature abstraction information comprises: encoding the feature segment in combination with the historical feature abstraction information by using a second encoder; and the decoding an encoding result comprises: decoding the encoding result by using a first decoder; wherein the historical feature abstraction information is generated according to output information of the decoder, wherein the second encoder comprises a P-layer convolution-augmented Conformer model, P being a positive integer; a number of the first decoder is Q, Q is a positive integer, and the Q first decoders are successively connected; and
  performing the following processing for any Conformer model: performing feature abstraction on a feature fragment currently processed in the Conformer model by using hidden layer features acquired from any first decoder, to obtain a feature vector with a predetermined length, and taking the feature vector as a historical feature vector of the currently processed feature fragment corresponding to the Conformer model, wherein the acquiring corresponding historical feature abstraction information comprises: for any Conformer model, splicing historical feature vectors of historical feature fragments corresponding to the Conformer model respectively, and taking a splicing result as the historical feature abstraction information.

2. The method according to claim 1, further comprising: performing convolutional downsampling on the audio feature, and encoding the downsampled audio feature.

3. The method according to claim 1, further comprising: determining peak information corresponding to the encoding feature in combination with the encoding of the audio feature and a Connectionist Temporal Classification (CTC) loss;
wherein the truncating the encoding feature comprises: truncating the encoding feature according to the peak information.

4. The method according to claim 3, wherein the truncating the encoding feature according to the peak information comprises:
taking an encoding feature located between each two adjacent peaks as a feature segment.

5. The method according to claim 1, wherein the encoding the audio feature comprises:
encoding the audio feature by using a first encoder, the first encoder comprising an M-layer causal convolution-augmented Conformer model, M being a positive integer, the casual Conformer model integrating a time-masked attention model and a causal convolution model.

6. A computer-implemented method for encoding and decoding, comprising:
acquiring a feature corresponding to a to-be-processed object, the feature comprising at least a feature obtained according to historical output information of a decoder, wherein the output information comprises: hidden layer features outputted by the decoder, the acquiring a feature corresponding to a to-be-processed object comprises: acquiring historical feature abstraction information corresponding to the to-be-processed object, the historical feature abstraction information being information obtained by feature abstraction of historical processing objects;
encoding the feature by using an encoder, to obtain an encoding result; and
decoding the encoding result by using the decoder, to obtain a processing result corresponding to the to-be-processed object;
performing feature abstraction on the to-be-processed object by using the hidden layer features acquired from the decoder, to obtain a feature vector with a predetermined length, and taking the feature vector as a historical feature vector corresponding to the to-be-processed object;
wherein the acquiring historical feature abstraction information corresponding to the to-be-processed object comprises: splicing historical feature vectors corresponding to the historical processing objects respectively, and taking a splicing result as the historical feature abstraction information.

7. The method according to claim 6, wherein
the to-be-processed object comprises: any one of continuous N feature fragments with unequal lengths obtained after an encoding feature corresponding to to-be-recognized speech is truncated, N being a positive integer greater than one, the encoding feature being a feature obtained after an audio feature of the to-be-recognized speech is encoded; and
the processing result comprises: a recognition result corresponding to the feature fragment.

8. An electronic device, comprising:
at least one processor; and
a memory communicatively connected with the at least one processor;
wherein the memory stores instructions executable by the at least one processor, and the instructions are executed by the at least one processor to enable the at least one processor to perform a speech recognition, wherein the speech recognition method comprises:
acquiring an audio feature of to-be-recognized speech collected by a user equipment in real time;
encoding the audio feature to obtain an encoding feature;
truncating the encoding feature to obtain continuous N feature fragments with unequal lengths, N being a positive integer greater than one;
acquiring, for any one of the feature segments, corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments, wherein the encoding the feature segment in combination with the historical feature abstraction information comprises: encoding the feature segment in combination with the historical feature abstraction information by using a second encoder; and the decoding an encoding result comprises: decoding the encoding result by using a first decoder; wherein the historical feature abstraction information is generated according to output information of the decoder, wherein the second encoder comprises a P-layer convolution-augmented Conformer model, P being a positive integer; a number of the first decoder is Q, Q is a positive integer, and the Q first decoders are successively connected; and
performing the following processing for any Conformer model: performing feature abstraction on a feature fragment currently processed in the Conformer model by using hidden layer features acquired from any first decoder, to obtain a feature vector with a predetermined length, and taking the feature vector as a historical feature vector of the currently processed feature fragment corresponding to the Conformer model, wherein the acquiring corresponding historical feature abstraction information comprises: for any Conformer model, splicing historical feature vectors of historical feature fragments corresponding to the Conformer model respectively, and taking a splicing result as the historical feature abstraction information.

9. The electronic device according to claim 8, further comprising:
performing convolutional downsampling on the audio feature, and encoding the downsampled audio feature.

10. The electronic device according to claim 8, further comprising:
- determining peak information corresponding to the encoding feature in combination with the encoding of the audio feature and a CTC loss; and
- wherein the truncating the encoding feature comprises: truncating the encoding feature according to the peak information.

11. The electronic device according to claim 10, wherein the truncating the encoding feature according to the peak information comprises:
- taking an encoding feature located between each two adjacent peaks as a feature segment.

12. The electronic device according to claim 8, wherein the encoding the audio feature comprises:
- encoding the audio feature by using a first encoder, the first encoder comprising an M-layer causal convolution-augmented Conformer model, M being a positive integer, the casual Conformer model integrating a time-masked attention model and a causal convolution model.

13. A non-transitory computer readable storage medium with computer instructions stored thereon, wherein the computer instructions are used for causing a speech recognition method, wherein the speech recognition method comprises:
- acquiring an audio feature of to-be-recognized speech;
- encoding the audio feature to obtain an encoding feature;
- truncating the encoding feature to obtain continuous N feature fragments with unequal lengths, N being a positive integer greater than one;
- acquiring, for any one of the feature segments, corresponding historical feature abstraction information, encoding the feature segment in combination with the historical feature abstraction information, and decoding an encoding result to obtain a recognition result corresponding to the feature segment, wherein the historical feature abstraction information is information obtained by feature abstraction of recognized historical feature fragments, wherein the encoding the feature segment in combination with the historical feature abstraction information comprises: encoding the feature segment in combination with the historical feature abstraction information by using a second encoder; and the decoding an encoding result comprises: decoding the encoding result by using a first decoder; wherein the historical feature abstraction information is generated according to output information of the decoder, wherein the second encoder comprises a P-layer convolution-augmented Conformer model, P being a positive integer; a number of the first decoder is Q, Q is a positive integer, and the Q first decoders are successively connected; and
- performing the following processing for any Conformer model: performing feature abstraction on a feature fragment currently processed in the Conformer model by using hidden layer features acquired from any first decoder, to obtain a feature vector with a predetermined length, and taking the feature vector as a historical feature vector of the currently processed feature fragment corresponding to the Conformer model, wherein the acquiring corresponding historical feature abstraction information comprises: for any Conformer model, splicing historical feature vectors of historical feature fragments corresponding to the Conformer model respectively, and taking a splicing result as the historical feature abstraction information.

* * * * *